United States Patent [19]

Deverrewaere

[11] 4,293,897
[45] Oct. 6, 1981

[54] MOTOR VEHICLE HEADLIGHT

[75] Inventor: Alain Deverrewaere, La Varenne, France

[73] Assignee: Cibie Projecteurs, France

[21] Appl. No.: 117,090

[22] Filed: Jan. 31, 1980

[30] Foreign Application Priority Data

Jan. 31, 1979 [FR] France ................................. 79 02483

[51] Int. Cl.³ ............................................. F21V 7/00
[52] U.S. Cl. ................................... 362/284; 362/307; 362/306; 362/398
[58] Field of Search ................ 362/284, 307, 398, 306

[56] References Cited

U.S. PATENT DOCUMENTS 2,281,643  5/1942  Wahlberg ............................. 362/83

Primary Examiner—Stephen J. Lechert, Jr.

[57] ABSTRACT

A motor vehicle headlight having a casing containing a pivotally mounted reflector which is pivoted in response to movement of a piston rod of a hydraulic piston and cylinder unit at an end of a hydraulic remote control system. The casing has an opening so positioned that when the unit is fitted therein the piston rod can easily engage a force transmission arrangement acting on a periphery of the reflector to pivot it when the rod is moved.

6 Claims, 5 Drawing Figures

FIG_1

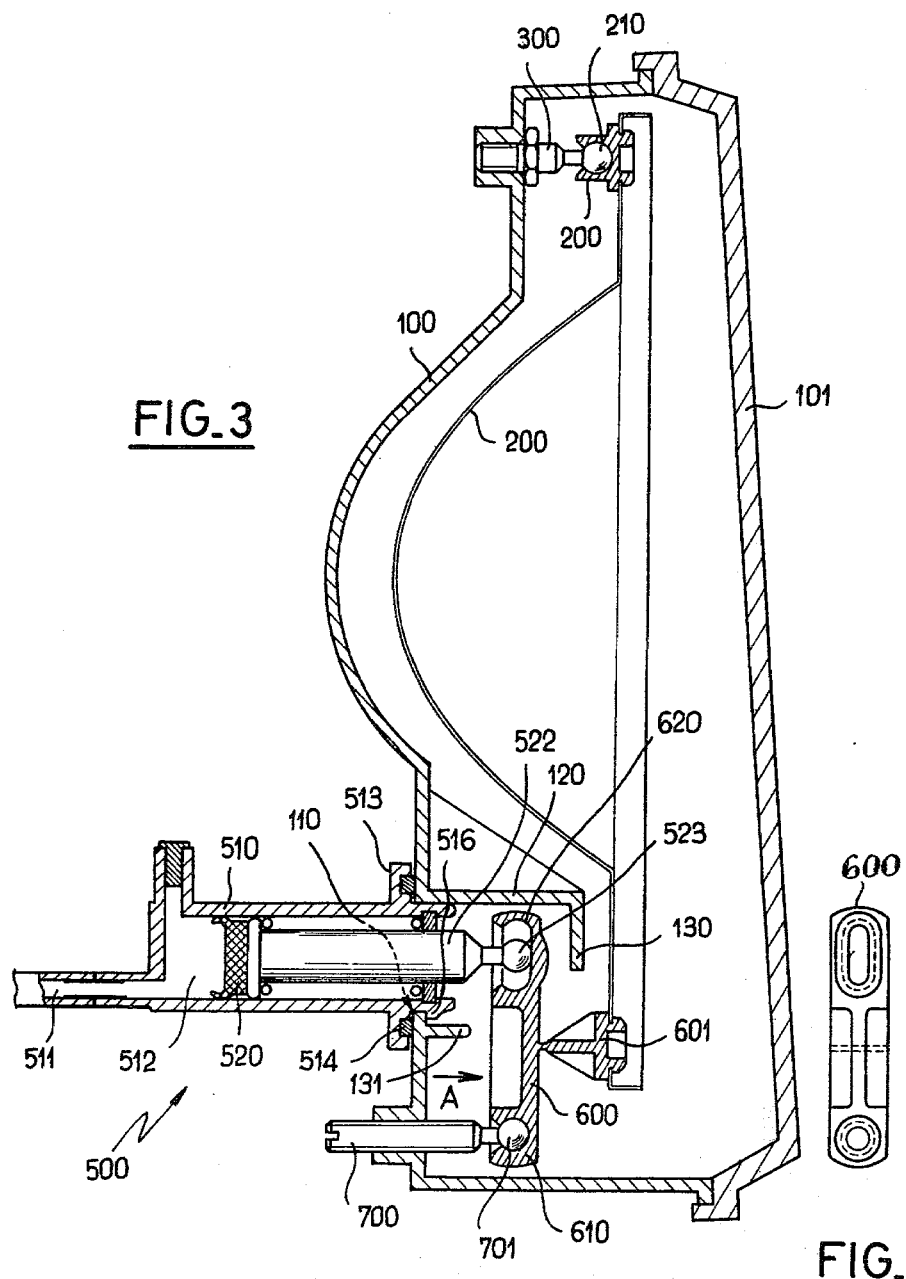

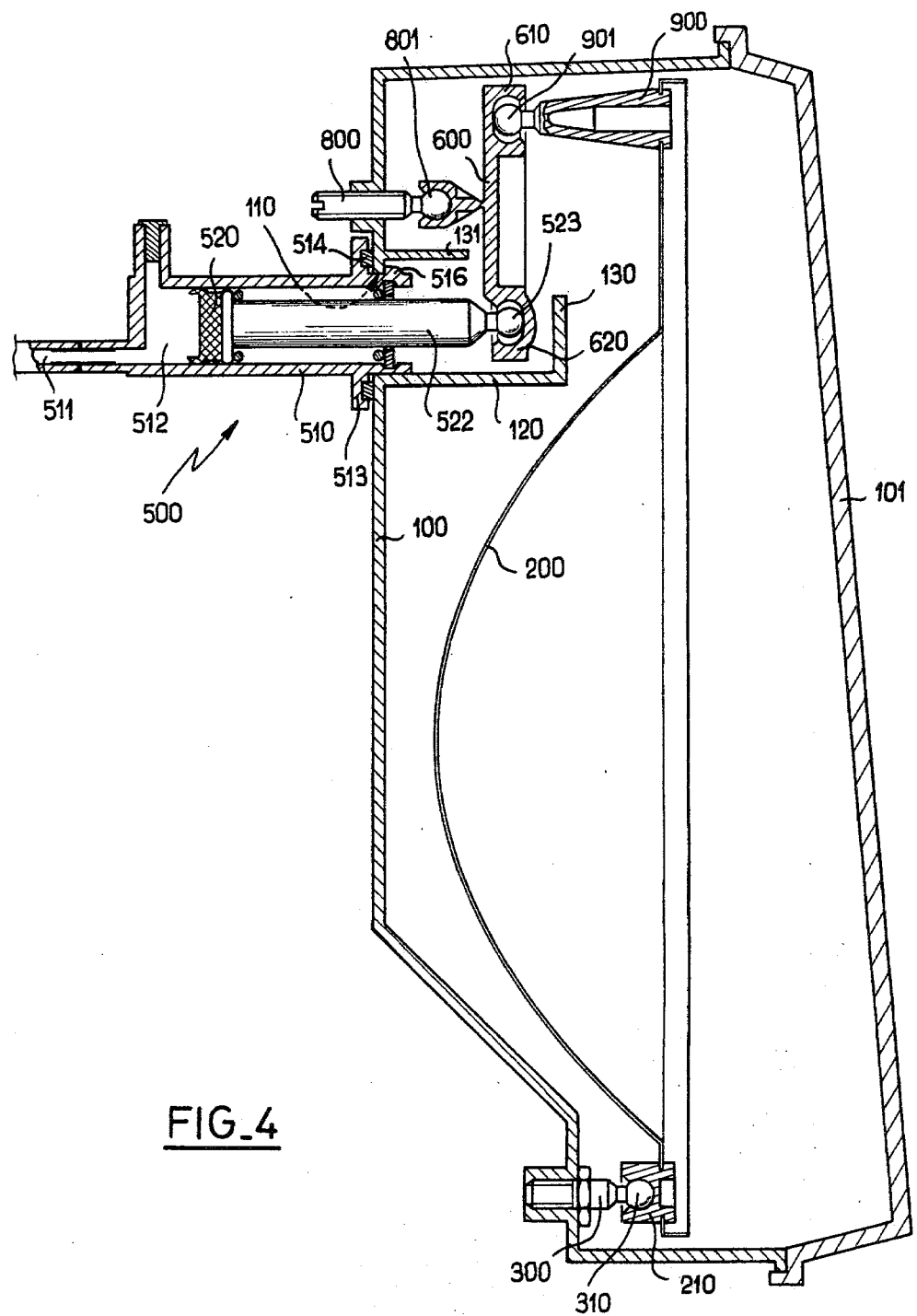
FIG_4

MOTOR VEHICLE HEADLIGHT

This invention relates to a motor vehicle headlight and more particularly to a headlight in which it is possible to carry out remote control adjustment of the inclination of its light beam depending on the attitude of the vehicle on which the headlight is mounted.

Adjusting devices are already known which have a remote control taking place either manually or automatically.

Both in the case of manual control and in the case of automatic control, various transmission chains have been proposed, for example mechanical chains comprising a Bowden wire or hydraulic transmission chains.

As examples of devices of this type, it is possible to mention those which are described in French Pat. Nos. 1 418 215 (Pierre CIBIE), 1 438 576, 1 458 985, 1 475 011 (PROJECTEURS CIBIE) or also 75 03145 (ROBERT BOSCH G.m.b.H.).

When devices of this type are fitted during mass production of motor vehicles, the connection of the transmission chain to the headlight is a relatively long, complicated and difficult operation.

Similarly, when a headlight is replaced on a vehicle in use, a connection of this type is frequently difficult.

An object of the invention is to avoid or at least mitigate these drawbacks and to this end proposes a structure of headlight facilitating connection of the transmission chain to the headlight.

According to the invention, there is provided a motor vehicle headlight comprising a casing closed by a front glass, a mirror mounted to pivot inside the casing, said casing being formed with an aperture serving for mounting a control member constituting an end of a remote control chain, said control member having an active part comprising a movable member which passes through the aperture, said pivoting mirror being provided with connecting means opposite said aperture, said connecting means being arranged for cooperation with said movable active part, and the aperture, the connecting means and the control member being arranged so that the mounting of the control member on the casing brings about operational connection of said movable active part and the mirror.

Preferably the transmission chain is hydraulic and the connection of the chain and of the headlight is effected through the intermediary of a cylinder/piston transducer member. The rod of the piston can constitute the movable active part of the transducer member for driving the movable mirror (aforementioned patent No. 1 475 011 and its addition 93 855).

The connecting means may be constituted in various ways, in order to cooperate automatically with the movable active part of the transducer member.

In a first embodiment, the connecting means is constituted by an abutment consisting of ferro-magnetic material which cooperates with a magnet, the magnet being located at an end of the piston rod of the transducer member and the abutment being mounted on the mirror. More generally, it is possible to use all types of connection by magnetic attraction between the mirror and the movable active part of the transducer member.

In another embodiment, said active part is provided with an end which is able to engage with a "snap action" effect in a receiving cradle associated with the mirror and able to move between two abutments integral with the casing.

In another embodiment, the receiving cradle is supported by a lever associated with the mirror and able to move between two abutments integral with the casing, this lever itself being pivoted about an end of an adjusting screw engaged in the casing. Thus, the position of the mirror depends both on the position of the active part of the transducer member and on the position of said adjusting screw.

The invention will now be further described, by way of example, with reference to the accompanying drawings, in which:

FIG. 3 is a similar section of a third embodiment of headlight formed according to the invention;

FIG. 3a is an elevation, seen in the direction of arrow A, of a part of the headlight in FIG. 3, and FIG. 4 is a vertical axial section of a fourth embodiment of headlight formed according to the invention.

In all the Figs., similar or corresponding parts are designated by the same reference numerals to facilitate understanding.

Figure 1:
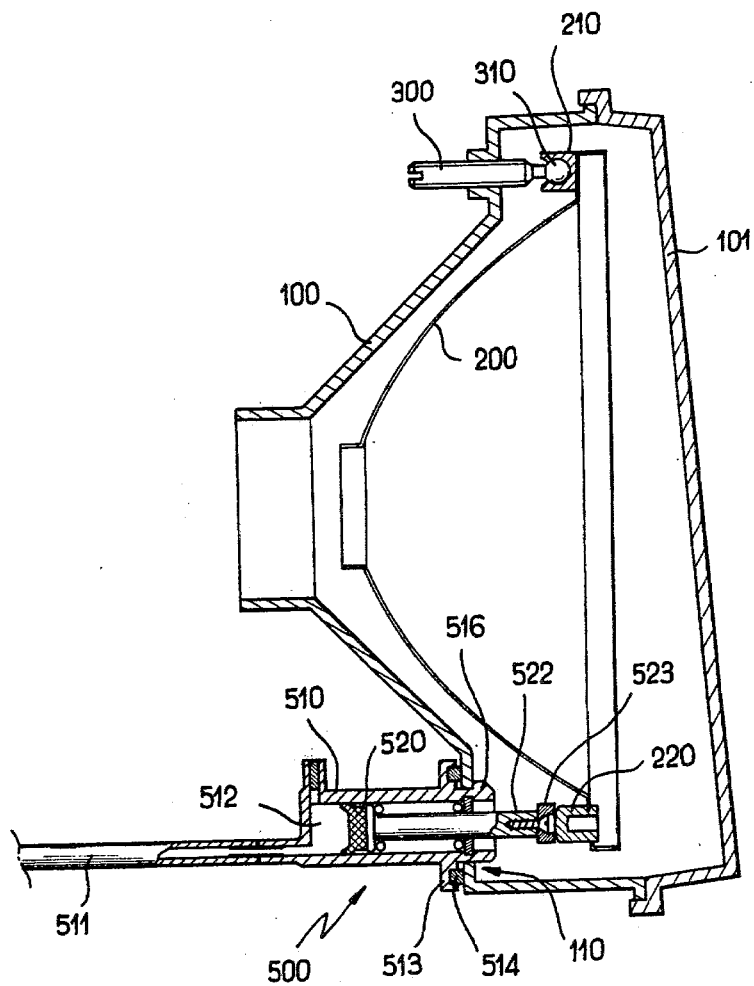
FIG. 1 is a vertical axial section of a first embodiment of headlight formed according to the invention.

The headlight comprises a casing 100, closed at its front part by a front glass 101 and inside of which a pivoting mirror 200 is mounted. In a manner known per se, the mirror 200 is a parabolic mirror able to support a bulb (not shown).

In all the embodiments, the mirror 200 is mounted to pivot in the following manner: at its upper part in FIGS. 1 to 3, or at its lower part in FIG. 4, the mirror supports a receiving block 210 of deformable plastics material. A screw 300 or similar member is fixed to the casing. At one end this screw is provided with an enlarged head 310 which cooperates with the block 210 under a "snap action" effect. Thus, the enlarged head 310 which is substantially spherical or cylindrical forms a ball and socket joint about which the mirror 200 may be oscillate, which is thus mounted to pivot about a horizontal transverse axis perpendicular to the plane of the Figs. The combination of the screw 300, head 310 and block 210 is described solely as an example, and is only one of a variety of known means which can be used for mounting a mirror so that it is able to pivot in a casing.

The casing, which is advantageously made from plastics material, is formed with an aperture 110. In FIGS. 1 to 3 the aperture 110 is at the bottom of the casing and is in facing relationship with the lower part of the mirror, whereas in FIG. 4 the aperture is in the upper part of the casing and faces an upper part of the mirror. A transmitter or transducer member 500 can be fitted into the aperture 110. The transducer 500 is intended to control the orientation of the mirror 200 under the effect of a transmission chain.

In the examples illustrated, the transmission chain is hydraulic and the transducer 500 is in the form of a hydraulic cylinder comprising an external body 510 and an internal piston 520. A hydraulic control circuit 511 supplies a chamber 512 on one side of the piston 520 which is loaded by a spring 521 (see FIG. 2). This piston is provided with a projecting piston rod 522. For its mounting on the aperture 110, the body 510 is provided with a flange 513 provided with an internal gasket 514 which can be compressed with a spring effect. Lugs 516 are provided at an end of the body 510. The aperture 110 has a circular cross-section which is very slightly greater than that of the body 510, and the edge of aperture is formed with notches to allow the passage of the lugs 516. Under these conditions, mounting is easy to understand: the body 510 is engaged in the aperture 110, the lugs passing through the corresponding notches. An engagement of this type compresses the gasket 514. The body 510 is rotated slightly in order that the lugs 516 cooperate with the wall of the casing inside the latter, the gasket 514 forming a spring ensuring the cohesion of an assembly of this type (which is an assembly of the bayonet type). The arrangements described thus far are common to all the embodiments. The association of the piston rod 522 with the mirror 200 will now be described, which varies from one embodiment to another.

In the embodiment in FIG. 1, the piston rod 522 is provided at its end with a magnet 523. The mirror 200 is provided at its lower part with a magnetic or ferromagnetic member 220. Under these conditions, the cooperation connection between the piston rod 522 and the mirror 200 takes place by magnetic attraction between the magnet 523 and the member 220. This attraction takes place during the actual fitting of the body 510. It will thus be seen that when the control member 500 is fitted on the casing 100, the operational connection of the movable active part of the control chain (in this case the piston rod 522) to the oscillating mirror 200 is also readily achieved.

It is easy to understand how in a headlight formed according to the invention the connection to the headlamp to the remote control chain is facilitated. In addition, since all the arrangements for the assembly are predetermined, a known state of adjustment is obtained at the time of fitting. Finally, when required, it is very easy to replace the control gain.

Figure 2:
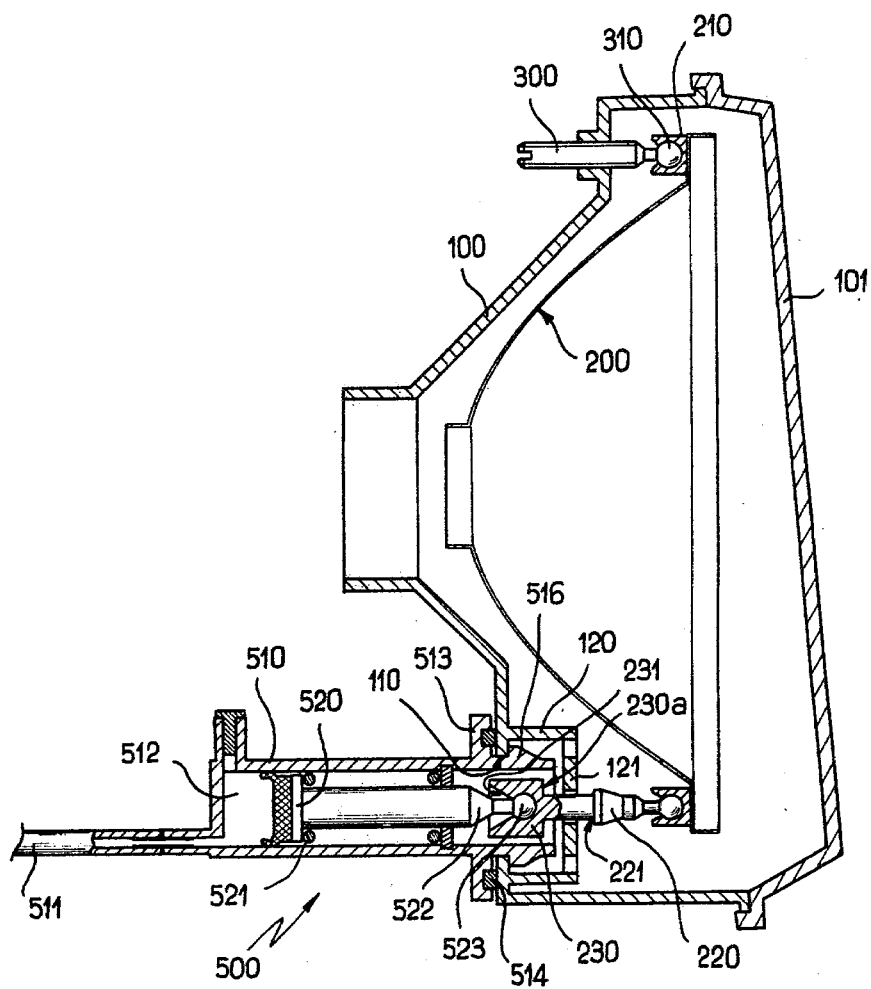
FIG. 2 is a similar section of a second embodiment of headlight formed according to the invention.

In the embodiment in FIG. 2, the mirror 200 is provided at its lower part with a connecting rod 220. The casing 100 has an internal cylinder 120 forming a housing which is closed by a wall 121 having a central opening. The rod 220 is associated with the mirror 200 by a snap action engagement (as shown) or any other securing means and it passes through the central opening in the wall 121. At its end remote from the mirror, the rod 220 is provided with a receiving block 230 formed with a funnel-shaped opening 231 comprising a spherical engagement region. The rod 220 has a shoulder 221 so that the displacement travel of the rod 220 is limited on the one hand by the abutment of this shoulder 221 against the wall 121 and on the other hand by the abutment of a shoulder 230a of the block 230 against the same wall 121, which facilitates engagement and disengagement.

The piston rod 522 is provided at its end with an enlarged head 523 able to cooperate by snap action engagement with the opening in the block 230. When the body 500 is fitted in the aperture 110, the enlarged head 523 engages in the engagement region in the opening 231.

In the embodiments in FIGS. 3 and 4, the control member is in the form illustrated in FIG. 2, with a piston rod 522 provided with an enlarged engaging head 523. The casing is provided internally with a housing cylinder 120, which is open on one side and defines two abutment members 130 and 131.

The features of FIGS. 3 and 4 relate to the connection of the enlarged head 523 to the reflector mirror 200.

In the case of FIG. 3 the mirror 200 is provided with a lever 600 connected at its centre to the mirror 200 by a mounting foot 601. At its opposite ends, the lever 600 is provided with engagement openings 610 and 620. The opening 610 serves for receiving by engagement an enlarged head of a screw 700 screwed into the casing. The head 701 engaged in the opening 610, constitutes the pivoting point of the lever 600. On the other hand, the engagement opening 620, which is oblong, receives the end 523 of the piston rod 522. It is easy to understand that this assembly allows the transmission of the movement of the piston rod 522 to the mirror 200, with a reduction effect (reduction by 2 in the example illustrated) as well as a possibility of adjusting the travel (by the screw 700).

In the embodiment in FIG. 4, the lever 600 has a ball and socket mounting at its central part so that the lever can pivot about enlarged head 801 of a screw 800 screwed into the casing. The opposite ends of the lever are formed with engagement openings 610 and 620. The opening 620 cooperates with the enlarged head 523 of the piston rod 522, and the opening 610 cooperates with an enlarged head 901 of a part 900 integral with the mirror 200.

The screw 800 may serve to adjust the travel.

In the case of FIGS. 3 and 4, it will be noted that the abutments 130 and 131 limit the displacement of the lever 600 and the mirror 200, which facilitates engagement and disengagement. FIGS. 3 and 4 again show the ease of connection as well as all the advantages explained with regard to the first embodiment.

I claim:

1. A motor vehicle headlight comprising a casing closed by a front glass, a mirror mounted to pivot inside the casing, said casing being formed with an aperture serving for mounting a control member constituting an end of a remote control chain, said control member having an active part comprising a movable member which passes through the aperture, said pivoting mirror being provided with connecting means opposite said aperture, said connecting means being arranged for cooperation with said movable active part, and the aperture, the connecting means and the control member being arranged so that the mounting of the control member on the casing brings about operational connection of said movable active part and the mirror.

2. A motor vehicle headlight as claimed in claim 1, in which the control member is a hydraulic transducer of the cylinder/piston type, whereof the active part is a piston rod.

3. A motor vehicle headlight as claimed in claim 1 or claim 2, in which the connecting means and the movable active part comprise at least one magnet cooperating with a magnetic or corresponding ferro-magnetic part.

4. A motor vehicle headlight as claimed in claim 1 or claim 2, in which the connecting means and the movable active part comprise corresponding male and female parts facilitating snap action engagement of the active movable part and the mirror, and abutments integral with the casing cooperate with the connecting means to limit travel of the connecting means.

5. A motor vehicle headlight as claimed in claim 4, in which the connecting means connected to the mirror comprises a lever having a central part mounted on the mirror, and said lever pivots at one end about a head of a screw mounted on the casing.

6. A motor vehicle headlight as claimed in claim 4, in which the connecting means connected to the mirror comprises a lever having a central part mounted to pivot about a screw mounted on the casing, and said lever is pivoted at one end on a part mounted on the mirror.

* * * * *